US012688033B2

(12) United States Patent
Sarcar et al.

(10) Patent No.: US 12,688,033 B2
(45) Date of Patent: Jul. 21, 2026

(54) AUTOMATICALLY RESOLVING MERGE CONFLICTS IN A COMPUTER SYSTEM

(71) Applicant: Microsoft Technology Licensing, LLC, Redmond, WA (US)

(72) Inventors: Amritam Sarcar, Sammamish, WA (US); Andrew Stephen Zeigler, Redmond, WA (US); Hitesh Kanwathirtha, Woodinville, WA (US); Zachary Michael Murphy, Seattle, WA (US); Javier Nisim Flores Assad, Bothell, WA (US); Jeffrey Tzu Heng Lin, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 220 days.

(21) Appl. No.: 18/421,557

(22) Filed: Jan. 24, 2024

(65) Prior Publication Data

US 2025/0238227 A1 Jul. 24, 2025

(51) Int. Cl.
*G06F 11/07* (2006.01)
*G06F 8/35* (2018.01)
(Continued)

(52) U.S. Cl.
CPC ................. *G06F 8/71* (2013.01); *G06F 8/30* (2013.01); *G06F 8/34* (2013.01); *G06F 8/35* (2013.01);
(Continued)

(58) Field of Classification Search
CPC ... G06F 8/71; G06F 8/658; G06F 8/35; G06F 8/65; G06F 8/73; G06F 8/42; G06F 8/70;
(Continued)

(56) References Cited

U.S. PATENT DOCUMENTS

| | | | |
|---|---|---|---|
| 10,296,310 B1 * | 5/2019 | Hazard | ..................... G06F 8/71 |
| 10,713,570 B1 * | 7/2020 | Hazard | ................. G06F 21/554 |

(Continued)

OTHER PUBLICATIONS

Chaochao She et al., Git Merge Conflict Resolution Leveraging Strategy Classification and LLM, 2023 IEEE, [Retrieved on Mar. 3, 2026]. Retrieved from the internet: <URL: https://ieeexplore.ieee.org/stamp/stamp.jsp?tp=&amnumber=10366637> 12 Pages (228-239) (Year: 2023).*

(Continued)

*Primary Examiner* — Anibal Riveracruz

(57) ABSTRACT

Merge conflicts are identified when changes from two different developers are merged into a code base in a code repository. When the changes from the two different developers conflict with one another, a merge conflict is identified. A pattern resolution system identifies whether the merge conflict contains any of a plurality of different conflict patterns. If so, a pattern conflict resolver, corresponding to the identified conflict pattern, is applied to the merge conflict to automatically resolve the merge conflict. If none of the pattern resolvers are applied to the merge conflict, the merge conflict is provided to a large language model for resolution. The Large Language Model (LLM) generates a proposed conflict resolution. A normalized divergence distance metric is calculated for the proposed conflict resolution and compared to a set of threshold values. The proposed conflict resolution is determined to be valid based upon the comparison.

20 Claims, 7 Drawing Sheets

(51) Int. Cl.

| | |
|---|---|
| *G06F 8/41* | (2018.01) |
| *G06F 8/65* | (2018.01) |
| *G06F 8/71* | (2018.01) |
| *G06F 9/445* | (2018.01) |
| *G06F 11/36* | (2025.01) |
| *G06F 8/30* | (2018.01) |
| *G06F 8/34* | (2018.01) |
| *G06F 8/658* | (2018.01) |
| *G06F 8/70* | (2018.01) |
| *G06F 8/73* | (2018.01) |
| *G06F 9/455* | (2018.01) |
| *G06F 9/54* | (2006.01) |
| *G06F 11/1471* | (2026.01) |
| *G06F 11/34* | (2006.01) |
| *G06F 11/3604* | (2025.01) |

(52) U.S. Cl.
CPC .................. *G06F 8/41* (2013.01); *G06F 8/42* (2013.01); *G06F 8/44* (2013.01); *G06F 8/65* (2013.01); *G06F 8/658* (2018.02); *G06F 8/70* (2013.01); *G06F 8/73* (2013.01); *G06F 9/44505* (2013.01); *G06F 9/455* (2013.01); *G06F 9/545* (2013.01); *G06F 11/079* (2013.01); *G06F 11/1471* (2013.01); *G06F 11/3495* (2013.01); *G06F 11/3608* (2013.01); *G06F 11/3616* (2013.01)

(58) Field of Classification Search
CPC ..... G06F 8/41; G06F 8/44; G06F 8/30; G06F 8/34; G06F 11/079; G06F 11/1471; G06F 11/3608; G06F 11/3616; G06F 11/3624; G06F 9/455; G06F 9/545; G06F 9/44505
See application file for complete search history.

(56) References Cited

U.S. PATENT DOCUMENTS

| | | | |
|---|---|---|---|
| 12,222,911 B1 * | 2/2025 | Singh .................. | G06N 3/0455 |
| 2021/0191715 A1 * | 6/2021 | Samudrala ............... | G06F 8/71 |
| 2024/0256423 A1 * | 8/2024 | Zhang ...................... | G06F 8/71 |
| 2025/0130780 A1 * | 4/2025 | Chandramohan ....... | G06F 40/30 |
| 2025/0138931 A1 * | 5/2025 | Koren ................ | G06F 11/0778 |

OTHER PUBLICATIONS

Pan, et al., "Can Program Synthesis be Used to Learn Merge Conflict Resolutions? An Empirical Analysis", In Repository of arXiv:2103.02004v1, Mar. 2, 2021, 12 pages.

Sung, et al., "Towards Understanding and Fixing Upstream Merge Induced Conflicts in Divergent Forks: An Industrial Case Study", In Proceedings of the ACM/IEEE 42nd International Conference on Software Engineering: Software Engineering in Practice, Sep. 18, 2020, 10 pages.

Zhang, et al., "Using Pre-trained Language Models to Resolve Textual and Semantic Merge Conflicts (Experience Paper)", In Proceedings of the 31st ACM SIGSOFT international symposium on software testing and analysis, Jul. 18, 2022, pp. 77-88.

* cited by examiner

AUTOMATICALLY RESOLVING MERGE CONFLICTS IN A COMPUTER SYSTEM

BACKGROUND

Computing systems are currently in wide use. Many such computing systems run a shared code base that is stored in a code repository. Such a code base is often developed by two or more different developers in a development system that uses distributed version control.

In a distributed version control-type system, each developer has a complete working copy of the project so that each developer can develop code in the project independently. In performing the development process, each developer modifies the code by making changes to the code, such as modifications, deletions, additions, etc. The changes are intermittently merged into the main code repository.

The discussion above is merely provided for general background information and is not intended to be used as an aid in determining the scope of the claimed subject matter.

SUMMARY

Code changes from two different developers are merged into a code base in a code repository. When the changes from the two different developers conflict with one another, a merge conflict is identified. A pattern resolution system identifies whether the merge conflict contains any of a plurality of different conflict patterns. If so, a pattern resolver, corresponding to the identified conflict pattern, is applied to the merge conflict to automatically resolve the merge conflict. If none of the pattern resolvers are identified and applied to the merge conflict, the merge conflict is provided to another system such as a large language model (LLM), a small language model (SLM), or another customized model, or another automated resolution generation system for resolution. The LLM, SLM, or other system generates a proposed conflict resolution. A normalized divergence distance metric is calculated for the proposed conflict resolution and compared to a set of boundary values. A determination is made as to whether the proposed conflict resolution is valid based upon the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
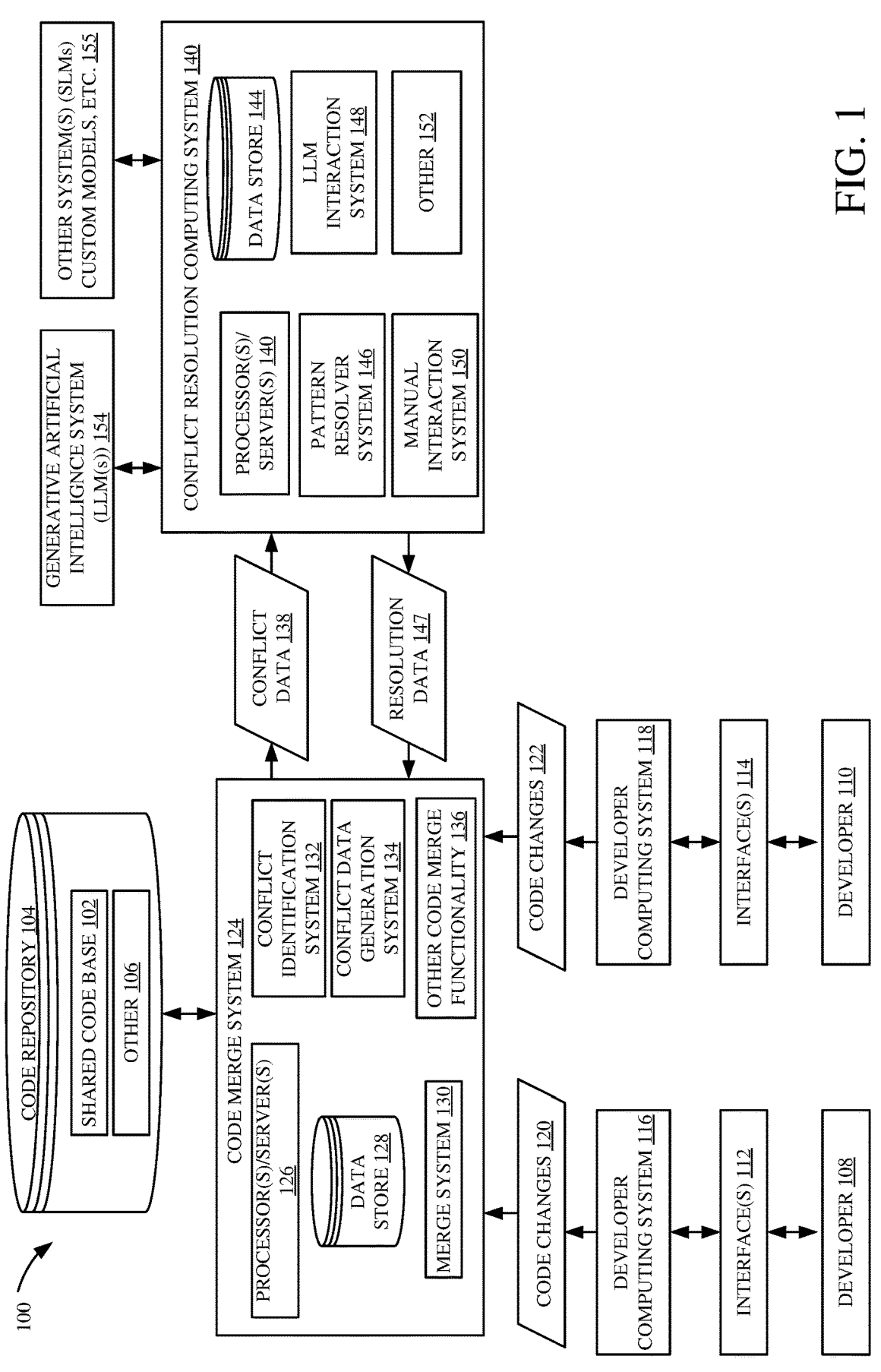
FIG. 1 is a block diagram of one example of a computing system architecture.

As discussed above, it is not uncommon for code to be developed in a distributed version control-type environment. In those cases, each developer may have a complete working copy of a software project so that each developer can perform development operations on that code base. When a developer makes changes, those changes are then merged into the main code repository, at which point conflicts can be identified. These conflicts are referred to as merge conflicts. A merge conflict may occur where two different developers change the same line of code in different ways. Further, merge conflicts may be identified where changes are not made to the exact same line of code but are made to a same region of code, such as where two different developers added different code at the same place in the code base. The merge conflicts must be resolved so that running the code base does not result in improper or erroneous execution, in the code crashing, etc.

The present description applies to any scenario where two or more developers are making changes to the same code base. However, some code bases are developed by thousands of different developers, each developer making hundreds of different changes per day. Thus, the likelihood of merge conflicts occurring in such scenarios is greatly increased.

Normally, merge conflicts are resolved manually. However, this is an error prone process, and it can be highly labor intensive. By way of example, for each merge conflict, a developer must examine the merge conflict, determine whether the code needs to be rewritten or restructured in order to resolve the conflict, build merge code that resolves the conflict, and then determine whether the merge code works properly. For instance, if a build is generated from the merge code and results in build errors, then the merge code is not correct.

In some other examples, the merge conflict is fed into a large language model (LLM), which is asked to generate a resolution to the merge conflict. However, this has not been highly effective. The proposed resolution generated by the LLM often still results in build errors, such that manual conflict resolution is still required. Running the LLM is expensive and therefore the approach of using an LLM to resolve merge conflicts often increases the cost of conflict resolution without a corresponding reduction in manual labor.

The present description thus describes a system that automatically detects whether a pre-defined pattern is present in a merge conflict. If so, the system automatically applies a corresponding pattern resolver to generate a resolution to the merge conflict. If no pattern is present in the merge conflict, then the present system automatically prompts a generative artificial intelligence (AI) system, such as an LLM, a small language model (SLM), or other customized model to generate a proposed resolution to the merge conflict. The present system also automatically computes a normalized divergence distance (NDD) value for the proposed resolution and automatically determines whether the proposed resolution is likely accurate, based upon the NDD value. If the proposed resolution is not likely accurate, then the merge conflict is output for resolution in a different way, such as using manual conflict resolution. The pattern resolvers are inexpensive to run, yet it has been found that the pattern resolvers can often resolve over fifty percent of merge conflicts with ninety percent accuracy. Further, it has been found that an LLM can resolve a majority of the remaining conflicts so that, when the NDD metric is employed, the present system can automatically resolve 88-90% of merge conflicts with greater than 90% accuracy. This greatly enhances the accuracy and efficiency of the conflict resolution process. By automatically, it is meant, in one example, that the operation or function is performed without further human involvement except, perhaps, to initiate or authorize the operation or function.

FIG. 1 is a block diagram of one example of a computing system architecture 100 in which a shared code base 102 is stored in a code repository 104 along with any of a wide variety of other items 106. A plurality of different developers 108-110 interact with interfaces 112-114 that are generated by developer computing systems 116-118 in order to perform development operations on the shared code base 102. Each developer computing system 116-118 may have its own working copy of the shared code base 102. Therefore, developers 108-110 generate code changes 120-122, respectively, to their working copies of the shared code base. The code changes 120-122 are provided to a code merge system 124 which attempts to merge the code changes into the shared code base 102 in code repository 104.

In the example shown in FIG. 1, code merge system 124 includes one or more processors or servers 126, data store 128, merge system 130, conflict identification system 132, conflict data generation system 134, and a wide variety of other code merge functionality 136. Merge system 130 attempts to merge the code changes 120 and the code changes 122 into the shared code base 102. Conflict identification system 132 identifies any merge conflicts that occur during the merge operation.

The conflicts can be identified in a wide variety of different ways, such as by identifying the source of build errors generated during a build operation, or in other ways. Conflict data generation system 134 accesses the code changes that spawned the merge conflict, as well as other data around the merge conflict (which is described in greater detail below) and provides the conflict data 138 to conflict resolution computing system 140.

Conflict resolution computing system 140 can include one or more processors or servers 142, data store 144, pattern resolver system 146, LLM interaction system 148, manual interaction system 150, and any of a wide variety of other interaction systems or other items 152. Pattern resolver system 146 (which is described in greater detail below with respect to FIG. 2) determines whether the merge conflict has any pre-defined patterns. If so, pattern resolver system 146 applies a corresponding pattern resolver that resolves conflicts with that pattern. Pattern resolver system 146 outputs the resolution as resolution data 147 which is then merged into shared code base 102.

If the merge conflict does not have any of the pre-defined patterns, then pattern resolver system 146 generates an output indicative of this to LLM interaction system 148 or other interactive systems 152. LLM interaction system 148 (or other systems 152) then generates a prompt using the conflict data 138 and provides that prompt to generative AI system (LLM(s)) 154 (or other systems 155). LLM(s) 154 or other system(s) 155 generate a response to the prompt. The response is indicative of a proposed conflict resolution. LLM interaction system 148 or other interaction systems 152 then determines whether the proposed conflict resolution is likely accurate.

In one example, LLM interaction system 148 or system 152 calculates a normalized divergence distance (NDD)

value corresponding to the proposed conflict resolution and compares the NDD value to a set of NDD boundary values (the NDD value and boundary values are also described in greater detail below). Based upon that comparison, LLM interaction system 148 or system 152 determines whether the proposed conflict resolution is likely accurate. If so, LLM interaction system 148 or other system 152 outputs the proposed conflict resolution as resolution data 147. If the proposed conflict resolution is not likely accurate, then LLM interaction system 148 or system 152 generates an output indicative of this to manual interaction system 150. Manual interaction system 150 can then surface the merge conflict for manual resolution, or resolution according to another resolution technique.

It will be understood that the present systems can request a proposed conflict resolution from LLM(s) 154 and/or other systems 155. The present description will proceed with respect to requesting a proposed resolution from LLM(s) 154, but this is by way of example only, and the discussion is just as applicable to requesting a proposed resolution from other systems 155 as well.

Figure 2:
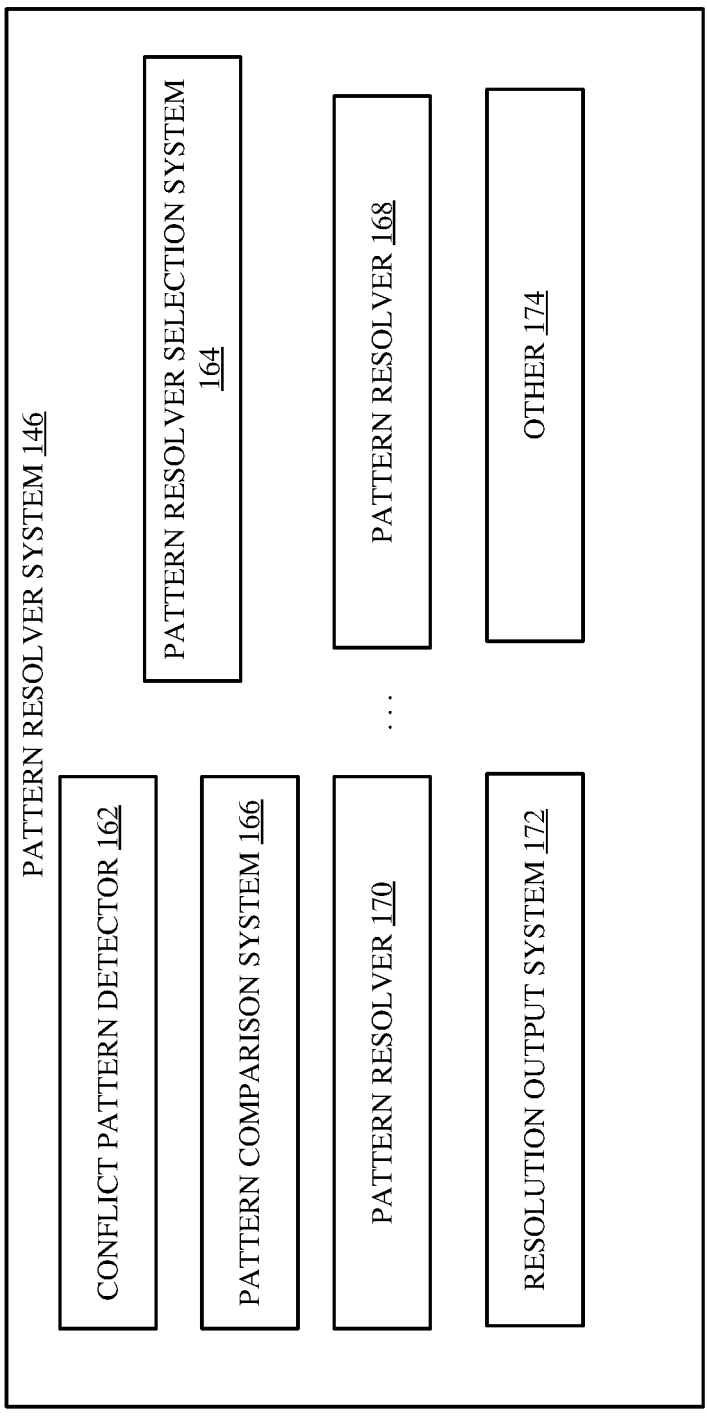
FIG. 2 is a block diagram showing one example of a pattern resolver system in more detail.

FIG. 2 is a block diagram showing one example of pattern resolver system 146 in more detail. In the example shown in FIG. 2, pattern resolver system 146 includes conflict pattern detector 162, pattern resolver selection system 164, pattern comparison system 166, a set of pattern resolvers 168-170, resolution output system 172, and other items 174. Each of the pattern resolvers 168-170 generates a conflict resolution for merge conflicts having a different pre-defined pattern. Conflict pattern detector 162 parses the conflict data 138 to determine whether any of a plurality of different pre-defined patterns (that are resolved by one of the pattern resolvers 168-170) are identified in that conflict data 138. If so, then pattern resolver selection system 164 determines which pattern resolver 168-170 resolves the pre-defined pattern detected in the conflict data 138. Resolver selection system 164 then selects and triggers that pattern resolver 168, with the conflict data 138, to resolve the conflict. Resolution output system 172 generates an output of the conflict resolution as resolution data 147 (shown in FIG. 1).

In one example, resolver selection system 164 identifies which pattern resolver to trigger by comparing the pattern detected in the conflict data 138 to the patterns resolved by the pattern resolvers 168-170. When a match is found, the corresponding pattern resolver is selected and triggered. The comparison of patterns can be done in a pre-defined order. For example, some patterns may occur more often than others so the detected patterns may be compared to the more often occurring patterns first. The order of resolver selection can be done in other ways as well. Therefore, assume that pattern selection system 164 first selects pattern resolver 168 for comparison. If the pattern corresponding to pattern resolver 168 does not match the pattern detected in the conflict data 138, then pattern resolver selection system 164 selects the next pattern resolver to determine whether its corresponding pattern matches the pattern detected in the conflict data 138. This continues through each of the pattern resolvers 168-170 until a match is found and the corresponding pattern resolver is applied to the conflict data 138 (triggered) to generate resolution data 147. If all of the patterns corresponding to the different pattern resolvers 168-170 have been compared to the pattern detected in conflict data 138, and there is no matching pattern (or if no pre-defined pattern is detected in the first place), then resolution output system 172 generates a signal indicative of this and provides that signal to LLM interaction system 148.

There are a wide variety of different types of conflict patterns that can be identified as pre-defined patterns, and that conflict pattern detector 162 can search for in the conflict data 138. The particular conflict patterns may vary based upon the language of the code base 102, based upon the particular development systems that are being used by the various developers, based upon the functionality incorporated in the shared code base 102, or for a wide variety of other reasons. Thus, the example patterns described herein are described for the sake of example only. One pattern in the C and C++ programming languages involves the #include directive. The #include directive causes a line in the code to be replaced by the contents of an identified file. Where two developers have used the #include directive on the same line of the shared code base 102, this may cause a merge conflict having the "#include" pattern. When a #include conflict occurs, the corresponding conflict resolver may resolve the conflict by using both sets of content that are to be included, but place one after the other in the code base, as but one example of a conflict resolution. Another pattern may be where multiple different types of conflict occur in the same region of the code base. In that instance, two or more different patterns may be identified and the corresponding pattern resolvers for those different patterns may be applied to resolve the conflicts individually. Then, the two or more conflict resolutions can be merged together. In other examples, conflict patterns may indicate that one developer has added code to a particular region of the code base 102 while another developer has deleted code from that region of the code base. In that case, the pattern resolver may accept both changes as the conflict resolution. These are just some examples of different conflict patterns that can be identified and the corresponding resolution functions that can be applied to resolve those conflicts. Again, based upon the programming language, based upon the particular functionality being developed or changed, based upon the type of developer computing systems being used, and based upon other variables, the particular pre-defined patterns that can be detected and the corresponding pattern resolvers that can be used may vary widely.

Figure 3:
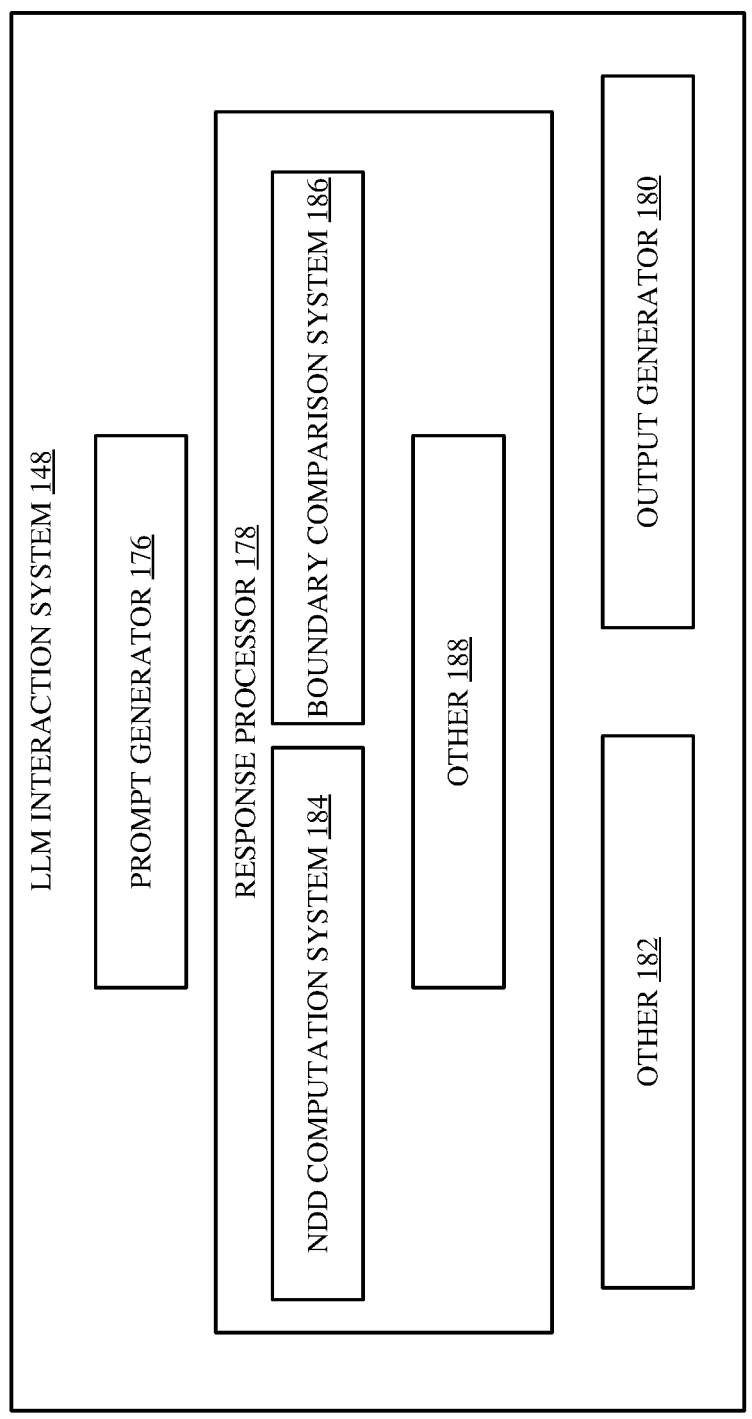
FIG. 3 is a block diagram of one example of an LLM interaction system in more detail.

FIG. 3 is a block diagram showing one example of LLM interaction system 148 in more detail. In the example shown in FIG. 3, LLM interaction system 148 includes prompt generator 176, response processor 178, output generator 180, and any of a wide variety of other functionality 182. Response processor 178 includes NDD computation system 184, boundary comparison system 186, and other items 188. In operation, once LLM interaction system 148 receives an output from pattern resolver system 146 (or elsewhere) indicating that no pre-defined patterns have been detected in the conflict data 138, then prompt generator 176 uses the conflict data 138 to generate a prompt to LLM(s) 154 (shown in FIG. 1). LLM(s) 154 may be language models having tens of billions to hundreds of billions of parameters. The prompt may, for example, provide the sets of code changes 120 and 122, as well as the original code that was changed and prompt LLM(s) 154 to respond with code that incorporates both code changes 120 and 122, but that is still functional code.

The prompt may also include a wide variety of different examples that show how prior similar merge conflicts were successfully resolved. The prompt may include code from the code base surrounding the merge conflict (e.g., code that comes before and after the merge conflict in the code base 102), as well as any of a wide variety of other information. The prompt is provided by prompt generator 176 to LLM(s) 154. The LLM(s) 154 generate a response indicative of a proposed conflict resolution. Response processor 178 receives and processes the proposed conflict resolution to determine whether it is likely accurate. NDD computation system 184 computes a normalized diversion distance corresponding to the proposed conflict resolution. NDD computation system 184 also computes an NDD value corresponding to the first set of code changes 120 that spawned the merge conflict and an NDD value corresponding to the second set of code changes 122 that spawned the merge conflict. The NDD values corresponding to code changes 120 and 122 may be used as boundaries to validate the proposed resolution output by LLM(s) 154. That is, if the NDD value corresponding to the proposed conflict resolution lies outside the range defined by the NDD values computed for code changes 120 and 122, then the proposed conflict resolution output by LLM(s) 154 is likely invalid. However, if the NDD value computed for the proposed resolution output by LLM(s) 154 is within the defined range, then the proposed resolution is likely valid.

Thus, NDD computation system 184 computes an NDD value for the set of code changes 120, for the set of code changes 122, as well for the proposed resolution output by LLM(s) 154. Boundary comparison system 186 compares the NDD value corresponding to the proposed resolution output by LLM(s) 154 to the boundary NDD values computed for the code changes 120 and 122, respectively, to determine whether the NDD value for the proposed resolution lies between the two boundary values. Output generator 180 generates an output based upon that comparison. If the NDD value corresponding to the proposed conflict resolution is within the boundary values, then output generator 180 outputs the proposed conflict resolution, along with an indication that it is likely valid, as resolution data 147. However, if the comparison shows that the NDD value corresponding to the proposed resolution lies outside of the boundary values, then output generator 180 generates an output indicating that the proposed conflict resolution output by LLM(s) 154 is likely invalid.

The NDD value for a set of code changes measures the distance between the code before it was modified by the set of code changes and the code after the code changes have been applied to it. Assume, for instance, that the original code is represented by X. Assume that the code, as modified by code changes 120 is represented by Y. Then, the NDD value for code changes 120 identifies the distance between X and Y. The distance may measure such things as the number of edits that must be performed to X in order to arrive at Y. The number of edits may include such things as insertions, modifications, deletions, transpositions, etc.

Assume also that the code X, after it has been modified by code changes 122 is represented by Z. Then, the NDD value corresponding to code changes 122 measures the difference between the original code X and the modified code Z. Similarly, assume that the original code X, after being modified to the proposed conflict resolution output by LLM(s) 154 is represented by W. Then, the NDD value corresponding to the proposed conflict resolution will be a measure of the distance between X and W.

As a simple example, assume that

X=AAABBBCCCDDDD

Assume further that

Y=AABBBBCCCDDDD

Assume further that

Z=AXBYBBYCCYDDDD

Then, the NDD value for Y would be smaller than the NDD value for Z because the distance between X and Y (the number of changes that must be made to X to obtain Y) is much smaller than the distance between X and Z.

The distance between two code sequences can be computed in a variety of different ways. In one example, the difference between the two code sequences is calculated using the Levenshtein distance plus the largest common subsequence (LCS). These distances can be combined and normalized to obtain the NDD value. In another example, the Smith-Waterman algorithm (employing differential scoring) can be used to identify the distance between the two code sequences. That distance can also be normalized in order to generate the NDD value.

It is mathematically proven that the NDD value corresponding to the two sets of code changes 120 and 122 that spawned the merge conflict can be used to bound the output of LLM(s) 154 in order to greatly enhance the accuracy of determining whether the proposed resolution output by LLM(s) 154 is accurate.

Figure 4A:
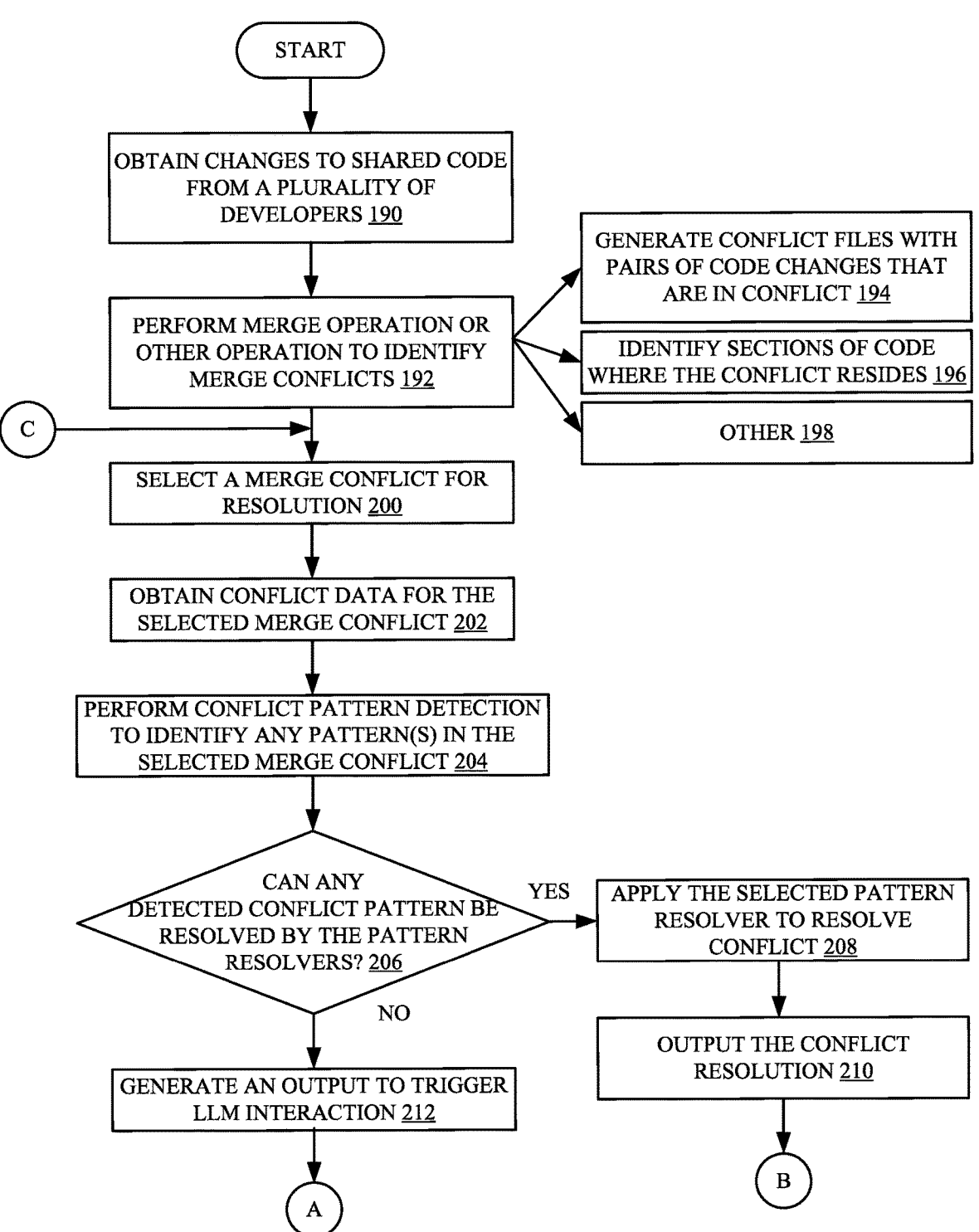
FIGS. 4A and 4B (collectively referred to herein as FIG. 4) show a flow diagram illustrating one example of the operation of the computing system architecture illustrated in FIG. 1 in more detail.
Figure 4B:
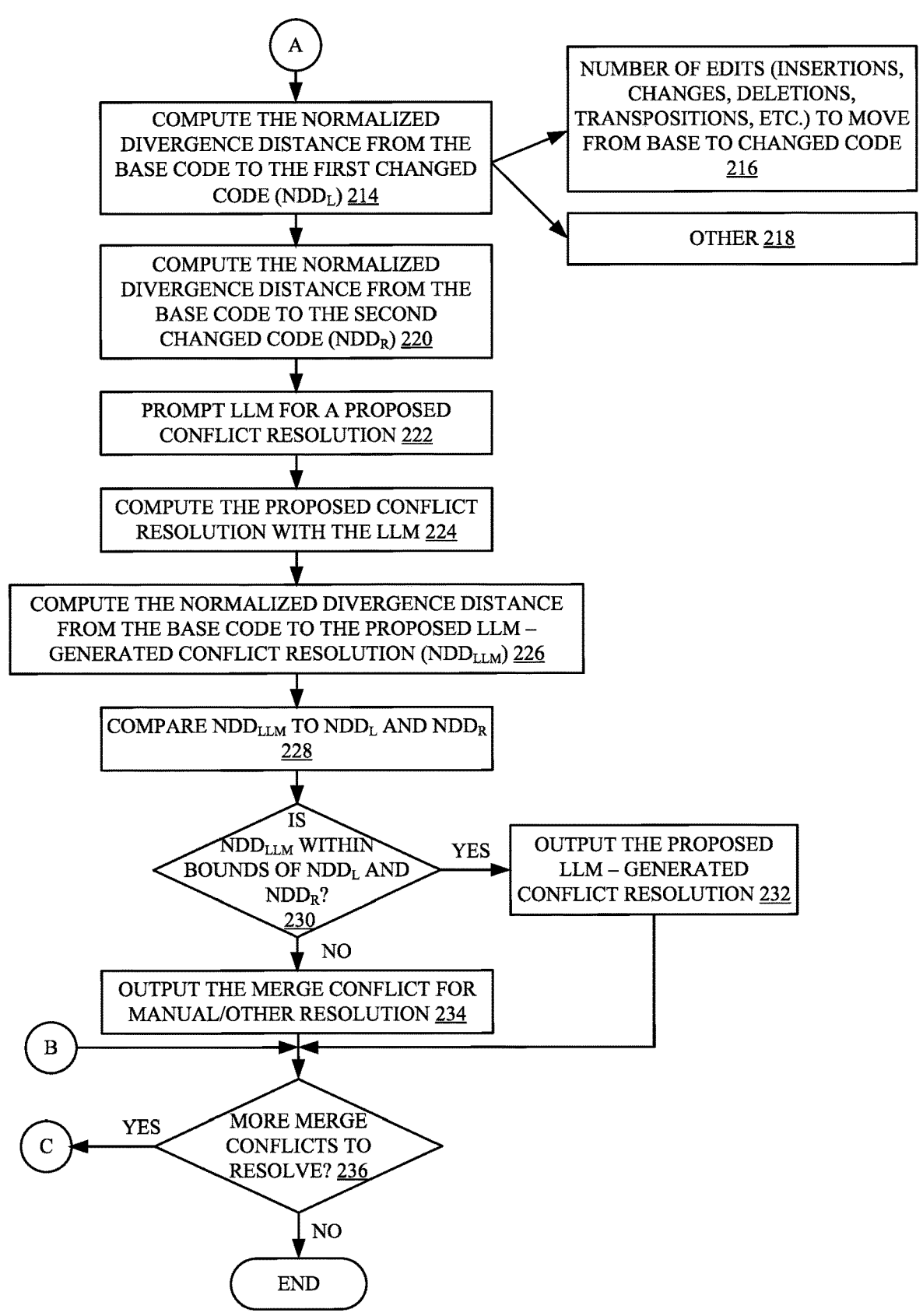

FIGS. 4A and 4B (collectively referred to herein as FIG. 4) illustrate a flow diagram showing one example of the operation of computing system architecture 100 illustrated in FIG. 1. It is first assumed that code merge system 214 receives code changes 120 and 122 to a shared code base 102 from a plurality of different developers or developer computing systems 116-118, as indicated by block 190 in the flow diagram of FIG. 4. Merge system 130 attempts to perform a merge operation to merge those code changes 120-122 into shared code base 102. The attempted merge operation may identify merge conflicts. Conflict identification system 132 can use other mechanisms for identifying merge conflicts as well, as indicated by block 192 in the flow diagram of FIG. 4.

Once a conflict is identified, conflict data generation system 134 generates conflict files corresponding to the merge conflict, as indicated by block 194. The conflict files may include the pairs of code changes 120, 122 that spawned the conflict. The conflict files may identify sections of code in shared code base 102 where the conflict resides, and include additional code on either side of the conflicting code, as indicated by block 196. The conflicts can be identified in a wide variety of other ways, and the conflict data 138 can also include other information, as indicated by block 198.

Conflict resolution computing system 140 selects a merge conflict for resolution, as indicated by block 200. Conflict resolution computing system 140 then obtains the conflict data 138 corresponding to the selected merge conflict, as indicated by block 202. Pattern resolver system 146 then attempts to resolve the conflict using a pattern resolver. In doing so, conflict pattern detector 162 performs conflict pattern detection to identify any pre-defined patterns in the conflict data 138 for the selected merge conflict. Attempting to detect such patterns is indicated by block 204 in the flow diagram of FIG. 4.

For any pre-defined patterns that are detected in the conflict data 138, pattern resolver comparison system 166 compares that pattern to the patterns resolved by the different pattern resolvers 168-170 to determine whether any detected conflict pattern can be resolved by any of the pattern resolvers 168-170. Making such a determination is indicated by block 206 in the flow diagram of FIG. 4. As discussed above, the pattern resolvers 168-170 can be evaluated in this way (to determine whether they may resolve the conflict) in a pre-defined order, based on any of a variety of ordering criteria. If a pattern resolver is identified, pattern resolver selection system 164 selects the pattern resolver that can be applied to resolve the merge conflict and triggers the selected pattern resolver to resolve the conflict, as indicated by block 208. The selected pattern resolver will then generate a conflict resolution and resolution output system 172 can output the conflict resolution as resolution data 147, as indicated by block 210.

However, if, at block 206, pattern comparison system 166 does not match the pattern detected in conflict data 138 against any of the patterns that can be resolved by pattern resolvers 168-170, then pattern resolver system 146 generates an output indicative of this, which triggers LLM interaction system 148 to begin processing. Triggering the LLM interaction system 148 is indicated by block 212 in the flow diagram of FIG. 4.

NDD computation system 184 then computes the NDD value indicative of the distance from the code base to the code as modified by the first set of changes 120, as indicated by block 214 in the flow diagram of FIG. 4. Again, the distance can be measured in terms of the number of edits (insertions, deletions, modifications, transpositions, etc.), that are needed to move from the code base to the changed code, as indicated by block 216. The distance can be calculated using a variety of different algorithms, or in other ways, as indicated by block 218.

NDD computation system 184 also computes the NDD value indicative of the distance from the code base to the code as modified by the second set of code changes 122, as indicated by block 220 in the flow diagram of FIG. 4. The first NDD value will be referred to as $NDD_L$ and the second NDD value will be referred to $NDD_R$.

Prompt generator 176 then prompts LLM(s) 154 for a proposed conflict resolution, as indicated by block 222, and NDD computation system 184 computes an NDD value for the proposed conflict resolution output by LLM(s) 154, as indicated by block 224. NDD computation system 184 then computes the NDD value indicative of the distance from the code in the code base to the proposed LLM-generated conflict resolution (identified herein as $NDD_{LLM}$). Computing $NDD_{LLM}$ is indicated by block 226 in the flow diagram of FIG. 4.

Boundary comparison system 186 compares $NDD_{LLM}$ to $NDD_L$ and $NDD_R$ as indicated by block 228. Boundary comparison system 186 determines whether $NDD_{LLM}$ is within the bounds set by (e.g., is between) $NDD_L$ and $NDD_R$, as indicated by block 230. If so, then output generator 180 generates an output including the proposed LLM-generated conflict resolution as resolution data 147. Outputting resolution data 147 is indicated by block 232 in the flow diagram of FIG. 4.

If boundary comparison system 186 determines that $NDD_{LLM}$ is not within the bounds of (e.g., is between) $NDD_L$ and $NDD_R$, then output generator 180 generates an output to manual interaction system 150 so that the merge conflict can be surfaced for manual or other resolution, as indicated by block 234 in the flow diagram of FIG. 4.

If there are more merge conflicts to be resolved, as indicated at block 236, then processing reverts to block 200 where the next merge conflict is selected for resolution. It will be noted, of course, that multiple merge conflicts can be resolved in parallel or simultaneously as well.

It can thus be seen that the present description describes a system which attempts to use pattern-based conflict resolvers to resolve merge conflicts with pre-defined patterns. Such pattern resolvers are very inexpensive to run (especially relative to an LLM) and can be run very quickly. If no pattern resolver can be used to resolve the conflict, then the present system uses a generative AI system to generate a proposed conflict resolution and calculates an NDD value to determine whether the proposed conflict resolution output by the LLM is likely accurate. It has been found that the present system can successfully resolve 88-90% of merge conflicts with 85-90% accuracy. It has also been shown that the pattern resolvers can resolve approximately 58% of merge conflicts so that the more expensive LLM(s) only need to be run in a minority of the cases. Thus, overall, only 10-12% of merge conflicts are resolved through manual activity or another technique. This significantly enhances the accuracy and efficiency of resolving conflicts in any development system where two or more different developers are modifying the same code base. The system also greatly reduces the use of computing system resources because it greatly reduces the need to run LLM(s) in resolving merge conflicts.

It will be noted that the above discussion has described a variety of different systems, components, resolvers, generators and/or logic. It will be appreciated that such systems, components, resolvers, generators and/or logic can be comprised of hardware items (such as processors and associated memory, or other processing components, some of which are described below) that perform the functions associated with those systems, components, resolvers, generators and/or logic. In addition, the systems, components, resolvers, generators and/or logic can be comprised of software that is loaded into a memory and is subsequently executed by a processor or server, or other computing component, as described below. The systems, components, resolvers, generators and/or logic can also be comprised of different combinations of hardware, software, firmware, etc., some examples of which are described below. These are only some examples of different structures that can be used to form the systems, components, resolvers, generators and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
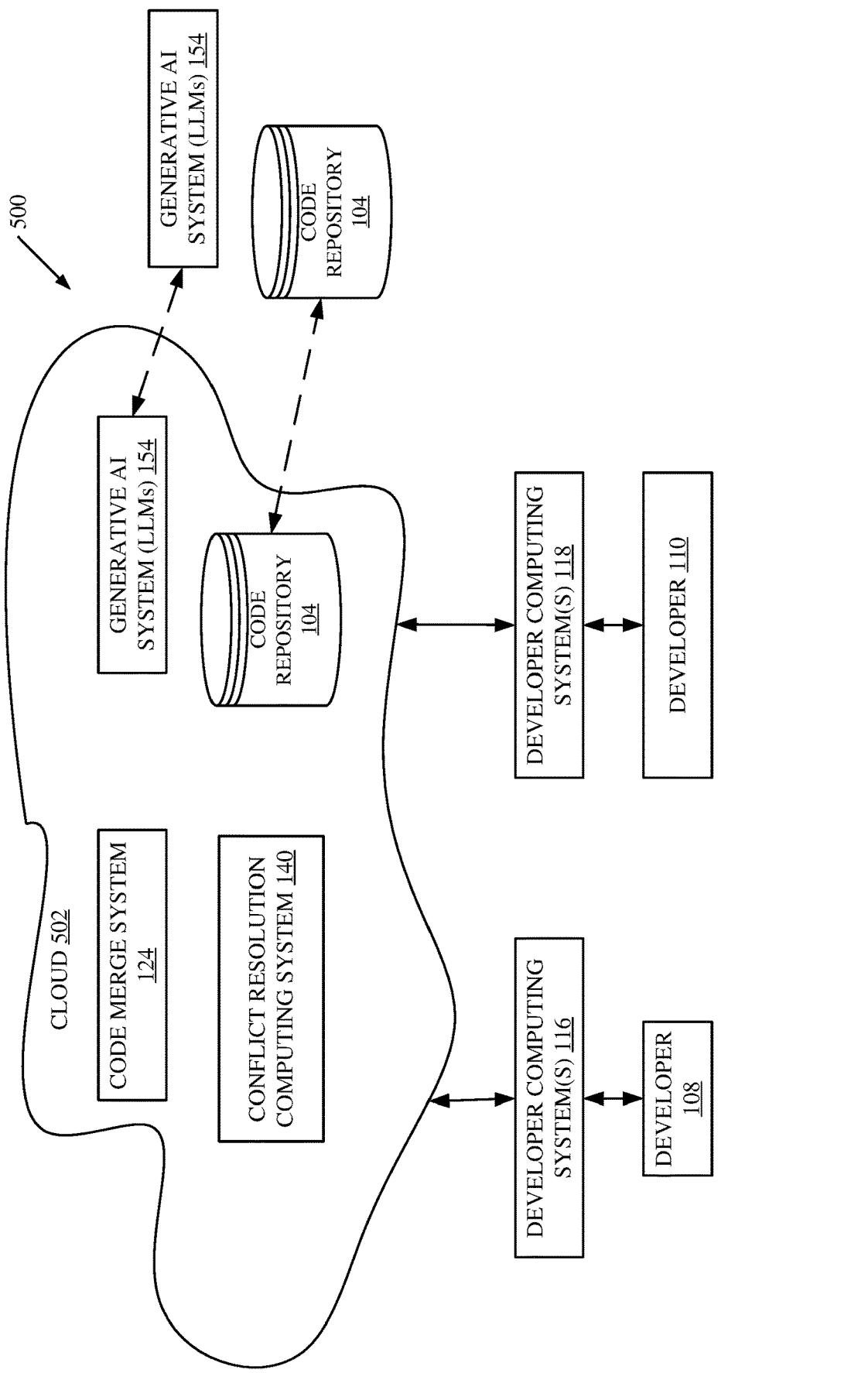
FIG. 5 is a block diagram showing the computing system architecture illustrated in FIG. 1 deployed in a remote server architecture.

FIG. 5 is a block diagram of architecture 100, shown in FIG. 1, except that its elements are disposed in a cloud computing architecture 500. The present architecture can all be run on a single machine, on a group of machines, and/or the present architecture can be hosted on a remote server architecture or distributed between local machines, remote servers, etc. The description of FIG. 5 shows one example where some portions of the architecture are in a remote server system, but this is just one example. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 124, 140, and 154, and repository 104 can be located in cloud 502 (which can be public, private, or a combination where portions are public while others are private). Therefore, developers 108-110 use a user device with developer computing systems 116-118 to access those systems through cloud 502.

FIG. 5 also depicts another example of a cloud architecture. FIG. 5 shows that it is also contemplated that some elements of architecture 100 can be disposed in cloud 502 while others are not. By way of example, data store 112 can be disposed outside of cloud 502, and accessed through cloud 502. Regardless of where they are located, the items can be accessed directly by systems 116-118, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices.

Some of those devices include servers, desktop computers, laptop computers, tablet computers, or other mobile devices, such as palm top computers, cell phones, smart phones, multimedia players, personal digital assistants, etc.

Figure 6:
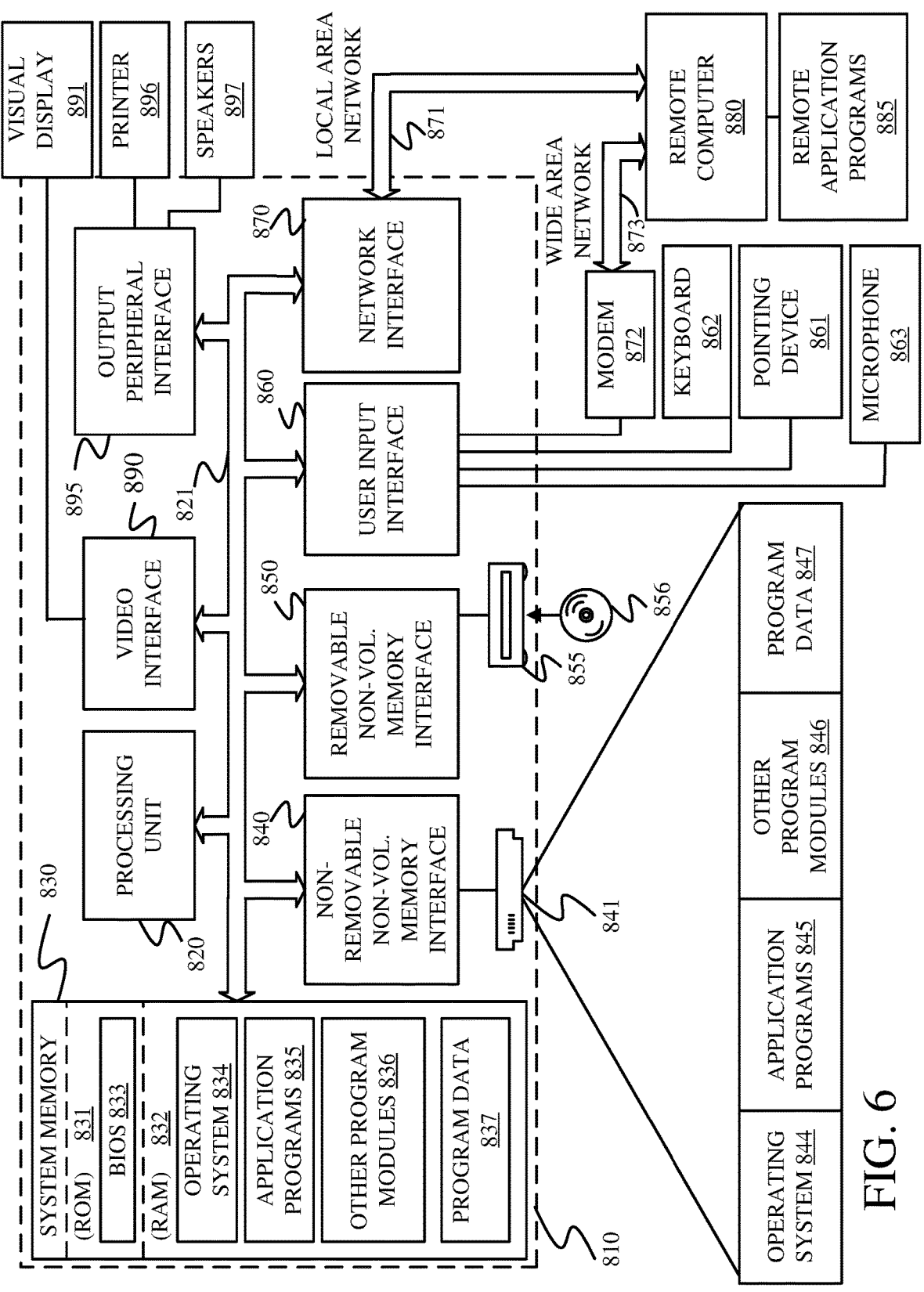
FIG. 6 is a block diagram showing one example of a computing environment that can be used in the architectures and systems described with respect to the previous figures.

FIG. 6 is one example of a computing environment in which architecture 100, or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage medica includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:

detecting a merge conflict between a first set of modified code generated based on first changes to a set of code in a shared code base and a second set of modified code generated based on second changes to the set of code in the shared code base;

detecting whether the merge conflict includes a pre-defined conflict pattern;

when the merge conflict includes a pre-defined conflict pattern, then:

invoking a pattern resolver corresponding to the pre-defined conflict pattern to automatically generate a conflict resolution to resolve the merge conflict, wherein invoking the pattern resolver comprises:

detecting whether a first pattern resolver, of a set of pattern resolvers, can generate a conflict resolution to resolve the merge conflict based on the detected pre-defined conflict pattern;

when the first pattern resolver is determined to be able to generate the conflict resolution, invoking the first pattern resolver to generate the conflict resolution;

when the first pattern resolver is determined to be unable to generate the conflict resolution, detecting, in a pre-defined order, whether a second pattern resolver in the set of pattern resolvers, can generate a conflict resolution to resolve the merge conflict, based on the detected pre-defined conflict pattern; and when the second pattern resolver is determined to be able to generate the conflict resolution, invoking the second pattern resolver to generate the conflict resolution; and when the merge conflict does not include a pre-defined conflict pattern, then:

prompting a generative artificial intelligence (AI) system for a proposed conflict resolution;

generating a normalized divergence distance (NDD) value for the proposed conflict resolution indicative of a distance that the proposed conflict resolution diverges from the set of code in the shared code base; and generating a conflict resolution output based on the NDD value.

2. The computer implemented method of claim 1, further comprising:

generating an NDD value for the first set of modified code indicative of a distance that the first set of modified code diverges from the set of code in the shared code base.

3. The computer implemented method of claim 2, further comprising:

generating an NDD value for the second set of modified code indicative of a distance that the second set of modified code diverges from the set of code in the shared code base.

4. The computer implemented method of claim 3, wherein generating the conflict resolution output based on the NDD value, comprises:

comparing the NDD value for the proposed conflict resolution to the NDD value for the first set of modified code to obtain a first comparison result.

5. The computer implemented method of claim 4, wherein generating the conflict resolution output based on the NDD value, comprises:

comparing the NDD value for the proposed conflict resolution to the NDD value for the second set of modified code to obtain a second comparison result.

6. The computer implemented method of claim 5, wherein generating the conflict resolution output comprises:

generating the conflict resolution output based on the first comparison result and the second comparison result.

7. The computer implemented method of claim 6, wherein generating the conflict resolution output based on the first comparison result and the second comparison result comprises:

generating, as the conflict resolution output, the proposed conflict resolution when the first comparison result and the second comparison result indicate that the NDD value for the proposed conflict resolution is between the NDD value for the first set of modified code and the NDD value for the second set of modified code.

8. The computer implemented method of claim 7, wherein generating the conflict resolution output based on the first comparison result and the second comparison result comprises:

generating, as the conflict resolution output, an indication that the merge conflict is to be resolved by an alternative technique when the first comparison result and the second comparison result indicate that the NDD value for the proposed conflict resolution is outside of a range defined by the NDD value for the first set of modified code and the NDD value for the second set of modified code.

9. A computer system, comprising:

at least one processor;

a plurality of pattern resolvers, implemented by the at least one processor, each different pattern resolver being configured to generate a conflict resolution for a merge conflict having a different conflict pattern;

a merge conflict identifier detecting a merge conflict between a first set of modified code generated based on first changes to a set of code in a shared code base and a second set of modified code generated based on second changes to the set of code in the shared code base;

a conflict pattern detector, implemented by the at least one processor, configured to detect a conflict pattern in the merge conflict;

a pattern resolver selection system, implemented by the at least one processor, selecting, in a pre-defined selection order, a pattern resolver of the plurality of pattern resolvers, determining whether the selected pattern resolver can generate a conflict resolution to resolve the merge conflict based on the detected conflict pattern and, when the selected pattern resolver can generate the conflict resolution, invoking the selected pattern resolver to generate the conflict resolution and, when the selected pattern resolver cannot generate the conflict resolution, selecting another pattern resolver, of the plurality of pattern resolvers, in the pre-defined selection order; and a resolution output system generating an output indicative of the generated conflict resolution or, when none of the pattern resolvers in the plurality of pattern resolvers were invoked to generate a conflict resolution to resolve the merge conflict, an indication that none of the pattern resolvers were invoked.

10. The computer system of claim 9, further comprising:

a model interaction system configured to, based on the output from the resolution output system indicating that none of the pattern resolvers were invoked, request a model to generate a proposed conflict resolution.

11. The computer system of claim 10, wherein the model interaction system comprises:

a normalized divergence distance (NDD) computation system configured to compute a proposed resolution NDD value for the proposed conflict resolution indicative of a distance that the proposed conflict resolution diverges from the set of code in the shared code base; and an output generator configured to generate a conflict resolution output based on the proposed resolution NDD value.

12. The computer system of claim 11, wherein the NDD computation system is configured to compute a first NDD value for the first set of modified code indicative of a distance that the first set of modified code diverges from the set of code in the shared code base and generate a second NDD value for the second set of modified code indicative of a distance that the second set of modified code diverges from the set of code in the shared code base, the output generator generating the conflict resolution output based on the first NDD value, the second NDD value, and the proposed resolution NDD value.

13. The computer system of claim 12, wherein the model interaction system comprises:

a boundary comparison system configured to compare the proposed resolution NDD value to the first NDD value to obtain a first comparison result and to compare the proposed resolution NDD value to the second NDD value to obtain a second comparison result.

14. The computer system of claim 13, wherein the output generator is configured to generate the conflict resolution output based on the first comparison result and the second comparison result.

15. The computer system of claim 14, wherein the output generator is configured to, generate, as the conflict resolution output, the proposed conflict resolution when the first comparison result and the second comparison result indicate that the proposed resolution NDD value is between the first NDD value and the second NDD value.

16. The computer system of claim 15, wherein the output generator is configured to, generate, as the conflict resolution output, an indication that the merge conflict is to be resolved by an alternative technique when the first comparison result and the second comparison result indicate that the proposed resolution NDD value is outside of a range defined by the first NDD value and the second NDD value.

17. A computer implemented method, comprising:

detecting a merge conflict between a first set of modified code generated based on first changes to a set of code in a shared code base and a second set of modified code generated based on second changes to the set of code in the shared code base;

detecting a conflict pattern in the merge conflict;

selecting, in a pre-defined selection order, a pattern resolver of a plurality of pattern resolvers, each different pattern resolver being configured to generate a conflict resolution for a merge conflict having a different conflict pattern;

determining whether the selected pattern resolver can generate a conflict resolution to resolve the merge conflict based on the detected conflict pattern;

after it is determined that the selected pattern resolver can generate a conflict resolution resolving the merge conflict, invoking the selected pattern resolver to generate the conflict resolution;

after it is determined that the selected pattern resolver cannot generate a conflict resolution resolving the merge conflict, selecting another pattern resolver, of the plurality of pattern resolvers, in the pre-defined selection order;

when a pattern resolver, of the plurality of pattern resolvers, is invoked, generating an output indicative of the generated conflict resolution; and when none of the pattern resolvers in the plurality of pattern resolvers is invoked to generate a conflict resolution to resolve the merge conflict, generating an output indicating that none of the pattern resolvers were invoked.

18. The computer implemented method of claim 17, further comprising:

based on the output indicating that none of the pattern resolvers were invoked:

prompting a generative artificial intelligence (AI) system for a proposed conflict resolution;

generating a normalized divergence distance (NDD) value for the proposed conflict resolution indicative of a distance that the proposed conflict resolution diverges from the set of code in the shared code base; and generating a conflict resolution output based on the NDD value.

19. The computer implemented method of claim 18, wherein the NDD value is measured in terms of a number of edits performed to modify the set of code in the shared code base to code associated with the proposed conflict resolution.

20. The computer implemented method of claim 17, wherein the pre-defined selection order is based on a frequency of occurrence of one or more predefined patterns.

* * * * *